United States Patent
Moore et al.

(10) Patent No.: US 10,171,457 B2
(45) Date of Patent: Jan. 1, 2019

(54) SERVICE PROVIDER INITIATED ADDITIONAL AUTHENTICATION IN A FEDERATED SYSTEM

(71) Applicant: International Business Machines Corporation, Armonk, NY (US)

(72) Inventors: David P. Moore, Robina (AU); Trevor S. Norvill, Parkwood (AU); Philip A. J. Nye, Southport (AU); Robert T. Trotter, Endeavour Hills (AU)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/982,116

(22) Filed: Dec. 29, 2015

(65) Prior Publication Data
US 2017/0187708 A1    Jun. 29, 2017

(51) Int. Cl.
*H04L 29/06*    (2006.01)

(52) U.S. Cl.
CPC ...... *H04L 63/0838* (2013.01); *H04L 63/0815* (2013.01); *H04L 63/10* (2013.01)

(58) Field of Classification Search
CPC .... H04L 63/0838; H04L 63/815; H04L 63/10
USPC .......................................................... 726/9
See application file for complete search history.

(56) References Cited

U.S. PATENT DOCUMENTS

| | | | | |
|---|---|---|---|---|
| 6,279,111 B1 * | 8/2001 | Jensenworth | ......... | G06F 21/335 713/159 |
| 6,944,761 B2 | 9/2005 | Wood et al. | | |
| 8,271,536 B2 * | 9/2012 | Amradkar | ........... | H04L 63/0807 707/802 |
| 8,769,651 B2 | 7/2014 | Grajek et al. | | |
| 8,843,997 B1 * | 9/2014 | Hare | .................... | H04L 63/0281 709/200 |
| 8,850,554 B2 | 9/2014 | Otranen et al. | | |
| 9,191,381 B1 * | 11/2015 | Popp | ........................ | G06F 21/34 |
| 9,240,886 B1 * | 1/2016 | Allen | ........................ | H04L 9/32 |
| 9,288,193 B1 * | 3/2016 | Gryb | ........................ | H04L 63/08 |
| 9,363,262 B1 * | 6/2016 | Wilkes | .................. | H04L 63/083 |
| 2003/0163733 A1 * | 8/2003 | Barriga-Caceres | ..... | G06F 21/33 726/5 |
| 2004/0010724 A1 * | 1/2004 | Brown | .................... | G06F 21/32 713/186 |
| 2006/0075224 A1 * | 4/2006 | Tao | ........................ | G06F 21/121 713/164 |
| 2007/0006291 A1 * | 1/2007 | Barari | .................. | G06F 21/335 726/10 |

(Continued)

OTHER PUBLICATIONS

SAP, 'One-Time Password Authentication Implementation Guide', Doc. Ver. 1.0—Mar. 31, 2017, SAP SE or an SAP affiliate company, entire document, https://help.sap.com/doc/PRODUCTION/5113c78995c54c06961fdbf9a6ed5b0c/2.0/en-US/One-TimePasswordAuthentication.pdf.*

(Continued)

*Primary Examiner* — Roderick Tolentino
*Assistant Examiner* — Ronald Baum
(74) *Attorney, Agent, or Firm* — Edward J. Wixted, III (57) ABSTRACT

An indication is received that a user has initiated an access to a website hosted by a service provider. Access to the website requires an authorization of a user identification associated with the user and a password associated with the user. A token is requested. The token provides access to an application programming interface. The token is received. The token is stored by the service provider.

8 Claims, 3 Drawing Sheets

(56) References Cited

U.S. PATENT DOCUMENTS

| | | | |
|---|---|---|---|
| 2009/0106826 A1* | 4/2009 | Palestrant | G06F 21/35 726/7 |
| 2009/0292927 A1* | 11/2009 | Wenzel | G06F 21/41 713/185 |
| 2009/0300747 A1* | 12/2009 | Ahn | G06F 21/34 726/9 |
| 2010/0299734 A1* | 11/2010 | Lynch | G06F 21/33 726/6 |
| 2012/0233668 A1* | 9/2012 | Leafe | G06F 9/44526 726/4 |
| 2014/0020073 A1* | 1/2014 | Ronda | G06F 21/31 726/7 |
| 2014/0059226 A1* | 2/2014 | Messerli | G06F 9/5072 709/226 |
| 2014/0215589 A1* | 7/2014 | Dietrich | G06F 21/34 726/6 |
| 2014/0344153 A1* | 11/2014 | Raj | G06Q 20/3821 705/44 |
| 2015/0106895 A1* | 4/2015 | Barbir | H04L 63/08 726/7 |
| 2015/0127547 A1* | 5/2015 | Powell | G06Q 20/382 705/67 |
| 2015/0128285 A1* | 5/2015 | LaFever | H04L 67/02 726/26 |
| 2015/0244699 A1* | 8/2015 | Hessler | G06F 21/44 726/7 |
| 2015/0254672 A1* | 9/2015 | Huesch | G06Q 20/02 705/44 |
| 2015/0281222 A1* | 10/2015 | Burch | H04L 63/0838 726/6 |
| 2015/0281225 A1* | 10/2015 | Schoen | H04L 63/06 726/9 |
| 2015/0332029 A1* | 11/2015 | Coxe | H04L 63/0815 726/9 |
| 2015/0350211 A1* | 12/2015 | Burgess | H04L 63/10 726/30 |
| 2016/0012465 A1* | 1/2016 | Sharp | G06Q 20/18 705/14.17 |
| 2016/0127454 A1* | 5/2016 | Maheshwari | H04L 47/70 709/223 |
| 2016/0134616 A1* | 5/2016 | Koushik | H04L 63/0807 726/9 |
| 2016/0140550 A1* | 5/2016 | Keys | H04L 63/0838 726/9 |
| 2016/0269379 A1* | 9/2016 | Livesay | G06K 9/00288 |
| 2016/0337328 A1* | 11/2016 | Sallam | H04L 63/08 |
| 2017/0034168 A1* | 2/2017 | Wilson | H04L 63/08 |
| 2017/0041296 A1* | 2/2017 | Ford | H04L 63/0421 |

OTHER PUBLICATIONS

Red Hat, Inc., 'Red Hat Single Sign-On 7.2 Server Administration Guide', 2018 Red Hat, Inc., entire document, https://access.redhat.com/documentation/en-us/red_hat_single_sign-on/7.2/pdf/server_administration_guide/Red_Hat_Single_Sign-On-7.2-Server_Administration_Guide-en-US.pdf.*

Hardt; "The OAuth 2.0 Authorization Framework"; Internet Engineering Task Force (IETF); Oct. 2012; pp. 1-152; Copyright 2012 IETF Trust and the persons identified as the document authors; Printed Aug. 13, 2015; <https://tools.ietf.org/html/rfc6749>.

Unknown; "Welcome to OpenID Connect"; OpenID; Printed Aug. 13, 2015; pp. 1-4; <http://openid.net/connect>.

Unknown; "McAfee One Time Password End of Life"; McAfee for Business; Printed Aug. 13, 2015; pp. 1; <http://www.mcafee.com/au/products/one-time-password-end-of-life.aspx>.

McKinney, Shawn; "SAML Specifications"; saml xml.org; Copyright 1993-2014 OASIS; Printed Aug. 13, 2015; pp. 1-2; <http://saml.xml.org/saml-specifications>.

Unknown; "Integrating VIP Login"; Symantec Validation and Identity Protection Service (VIP); Symantec; Copyright 2015 Symantec Corporation; pp. 1-51.

Unknown; "Smart Bridging of the Identity Cloud"; Trust Builder; Printed Aug. 13, 2015; pp. 1-3; <http://www.trustbuilder.be/>.

* cited by examiner

SERVICE PROVIDER INITIATED ADDITIONAL AUTHENTICATION IN A FEDERATED SYSTEM

BACKGROUND OF THE INVENTION

The present invention relates generally to the field of secure website access, and more particularly to access, initiated by a service provider, to a high value transaction using an additional authentication.

Many websites available today on the World Wide Web (W3) are available to anyone and require no credentials to access. Other websites may require some form of credentials (e.g., a user identification, or id, and password) to be submitted by a user in order to gain access to the website. Other "high value" websites, such as a financial institution or a medical office, or transactions (e.g., a money transfer) at a specific website may require credentials beyond the user id and password.

Companies that utilize a Federated Single Sign-On (FSSO) technology provide users with a seamless methodology for accessing member websites. With a "federated" identity, the electronic identity and attributes of a user are linked together and stored across multiple, distinct identity management systems. FSSO systems allow a single user authentication process (e.g., a user id and password) across a federated system of multiple companies, organizations, and Information Technology (IT) systems.

SUMMARY

Embodiments of the present invention include a method, computer program product, and computer system for access, initiated by a service provider, to a high value transaction using an additional authentication. In one embodiment, an indication is received that a user has initiated an access to a website hosted by a service provider. Access to the website requires an authorization of a user identification associated with the user and a password associated with the user. A token is requested. The token provides access to an application programming interface. The token is received. The token is stored by the service provider.

DETAILED DESCRIPTION

Some embodiments of the present invention recognize that several methods exist for accessing a website or other content on the World Wide Web (W3). Those methods include access with no required credentials, access requiring low level credentials such as a user id and password, and access requiring additional authentication above and beyond a user id and password. The process for a user to provide an additional authentication may be cumbersome if, for example, the current session of the user has expired and the user is first required to provide low level credentials.

Embodiments of the present invention recognize that there may be a method, computer program product, and system for accessing, initiated by a service provider, a high value transaction using an additional authentication. In an embodiment, a 'high value transaction' may be defined via a digital policy as an area of a website that requires an additional credential in order to access the area, even though a user may already be signed into the website. The digital policy defines a declarative access control policy language and a processing model describing how to evaluate access requests according to the rules defined in the policy. For organizations belonging to a federated system which use a Federated Single Sign-On (FSSO), one user id and password (i.e., sign-on) allows a user access to the website of each of the member organizations. A user may establish an on-line session at the website of one of the member organizations with the FSSO credentials. An on-line session may be the user logging onto the website of an organization using a smartphone or any other device connected to the W3. If the user then wants to access a 'high value' (e.g., a financial) transaction at that website but the session has expired or timed out, the user may first have to re-enter their FSSO credentials again before providing a one-time password credential to gain access to the high value transaction website. The present invention may allow for the establishment of a set of tokens during the initial FSSO which are restricted to Application Programming Interface (API) access to the additional authentication process. When the user wants to access the high value operation at a particular service provider, the service provider may use the tokens to authenticate and authorize the user to the additional authentication service without requiring the FSSO credentials.

Figure 1:
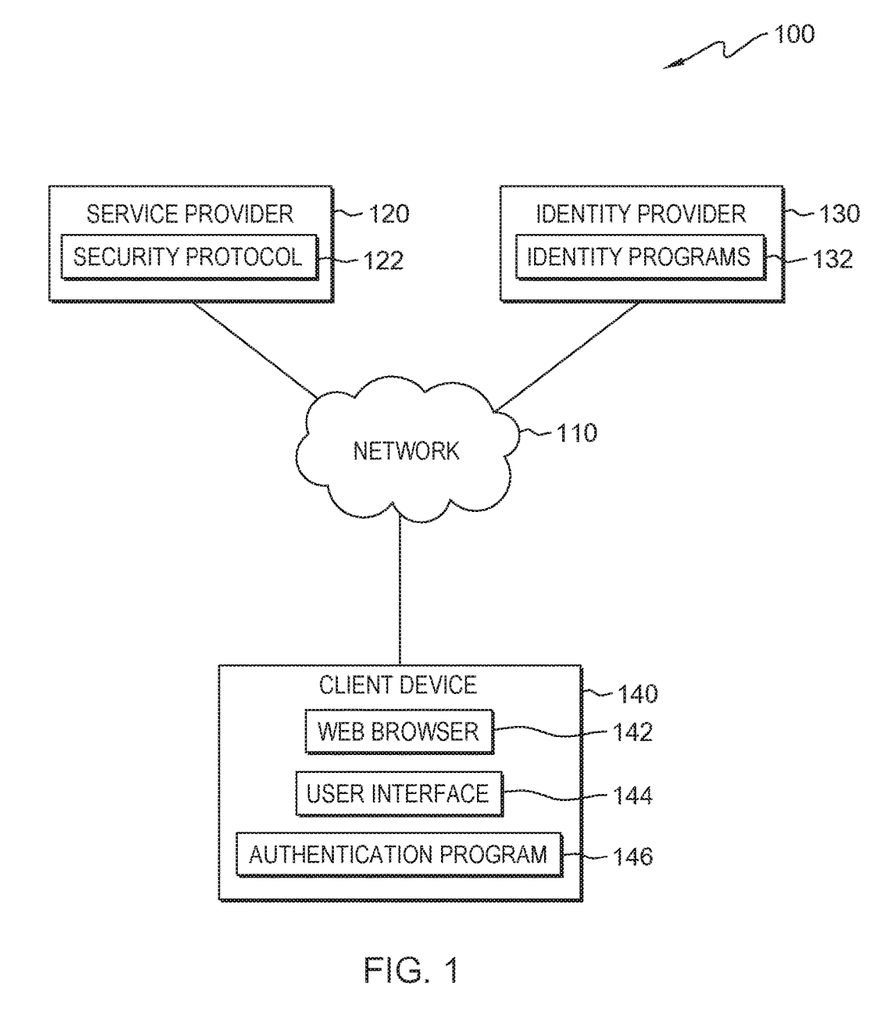
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes service provider 120 which includes security protocol 122. Computing environment 100 also includes identity provider 130 which includes identity programs 132. Computing environment 100 further includes client device 140 which includes web browser 142, user interface 144, and authentication program 146. Service provider 120, identity provider 130 and client device 140 are interconnected via network 110. In example embodiments, computing environment 100 may include other computing devices not shown such as smartwatches, cell phones, smartphones, phablets, tablet computers, laptop computers, desktop computers, other computer servers or any other computer system known in the art, interconnected with service provider 120, identity provider 130, and client device 140 over network 110.

In example embodiments, service provider 120, identity provider 130, and client device 140 may connect to network 110 which enables client device 140 to access other computing devices and/or data not directly stored on client device 140. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between client device 140, service provider 120, identity provider 130, and other computing devices (not shown) within computing environment 100, in accordance with embodiments of the present invention.

In embodiments of the present invention, service provider 120 may be a laptop, tablet or netbook personal computer (PC), a desktop computer, a personal digital assistant (PDA), a smartphone, or any other hand-held, programmable electronic device capable of communicating with any computing device within computing environment 100. In certain embodiments, service provider 120 represents a computer system utilizing clustered computers and components (e.g., database server computers, application server computers, etc.) that act as a single pool of seamless resources when accessed by elements of computing environment 100. In general, service provider 120 is representative of any electronic device or combination of electronic devices capable of executing computer readable program instructions. Computing environment 100 may include any number of service provider 120. Service provider 120 may include components as depicted and described in further detail with respect to FIG. 3, in accordance with embodiments of the present invention. Identity provider 130 and client device 140 are substantially similar to service provider 120. In an embodiment, service provider 120 may provide web hosting services to internet users. In another embodiment, service provider 120 may be a shared drive accessible by multiple user. In an embodiment, identity provider 130 may provide storage of authenticated identities to other service providers. In an embodiment, client device 140 may be used by a user to access the W3.

In an embodiment, security protocol 122 may be an open standard data format for exchanging authentication and authorization data between multiple parties, particularly between a service provider and an identity provider. A service provider may be a role undertaken by a system entity where the system entity provides services to users or other system entities. An identity provider may be described as a service provider for storing authenticated identity profiles and offering incentives to other service providers with the goal of federating user identities. It should be noted that identity providers may also provide services beyond those related to the storage of identity profiles. Security protocol 122 defines the interactions between a user, a service provider and an identity provider. For example, a user may request access to a service from a service provider. The service provider requests and obtains an identity assertion from the identity provider. The assertion may be an indication to the service provider that the identity provider knows and validates the user. Based on this assertion, the service provider may make an access control decision; i.e., whether to perform the requested service for the user. Prior to delivering the assertion to the service provider, the identity provider may request information from the user such as a user id and password in order to authenticate the user.

According to embodiments of the present invention, identity provider 130 includes identity programs 132. Identity provider 130 may be a service provider for storing identity profiles and offering incentives to other service providers with the goal of federating user identities. A federated identity in information technology may be a means of linking the electronic identity and attributes of a user, stored across multiple distinct identity management systems. Identity provider 130 may also provide services beyond those related to the storage of identity profiles.

In an embodiment, identity programs 132 provides one or more of the following functions for identity provider 130: point of contact; FSSO token service; authentication service; API authorization provider; and one-time password (OTP) provider. In an embodiment, the point of contact is the coordinator of services for identity provider 130. In an embodiment, the FSSO token service authenticates users, generates attribute assertions, and inserts API authorization tokens into the security system attributes for future use. In an embodiment, the API authorization provider generates API tokens based on a request from the FSSO token service. In an embodiment, the OTP provider creates an OTP, provides the OTP to a user, and validates the OTP for identity provider 130.

In embodiments of the present invention, client device 140 includes web browser 142, user interface 144, and authentication program 146. In an embodiment, web browser 142 (commonly referred to as a browser) is a software application whose primary purpose is to bring information resources to the user ("retrieval" or "fetching"), allowing them to view the information ("display", "rendering"), and then access other information ("navigation", "following links") on the W3. In an embodiment, an information resource may be identified by a Uniform Resource Identifier (URI) and may be a webpage, image, video or other piece of content. The most common form of URI is the uniform resource locator (URL), frequently referred to informally as a web address. URLs occur most commonly to reference webpages (http), but may also be used for file transfer (ftp), email (mailto), database access (JDBC or Java Database Connectivity), and many other applications. Hyperlinks present in resources enable users to easily navigate their browsers to related resources. Although browsers are primarily intended to use the W3, they can also be used to access information provided by web servers in private networks or files in file systems. Common features found in browsers include: forward and back buttons, a refresh button, a stop button, a home button, an address bar, a search bar, and a status bar.

In an embodiment, user interface 144 provides an interface between a user of client device 140, network 110 and any other devices connected to network 110. User interface 144 allows a user of client device 140 to interact with web browser 142 and also enables the user to receive an indicator of one or more previous viewing locations and a summary of viewing history. In general, a user interface is the space where interactions between humans and machines occur. User interface 144 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 144 may also be mobile application software that provides an interface between a user of client device 140 and network 110. Mobile application software, or an "app," is a computer program designed to run on smartphones, phablets, tablet computers and other mobile devices.

In embodiments of the present invention, authentication program 146 may be a program, subprogram of a larger program, application, plurality of applications or mobile application software which functions to access, initiated by a service provider, a high value transaction using an additional authentication. Mobile application software, or an "app," is a computer program designed to run on smartphones, phablets, tablet computers and other mobile devices. In one embodiment, authentication program 146 functions as a stand-alone program residing on client device 140. In another embodiment, authentication program 146 may be included as a part of an operating system (not shown) of client device 140. In yet another embodiment, authentication program 146 may work in conjunction with other programs, applications, etc., found on client device 140 or in computing environment 100. In yet another embodiment, authentication program 146 may be found on service provider 120, identity provider 130, or other computing devices (not shown) in computing environment 100 which are interconnected to client device 140 via network 110.

According to embodiments of the present invention, authentication program 146 utilizes tokens, restricted to only requesting authentication and authorization information from identity programs 132 to streamline access, by a user, to a high value transaction. The access is streamlined by not requiring the user to re-enter FSSO credentials.

Figure 2:
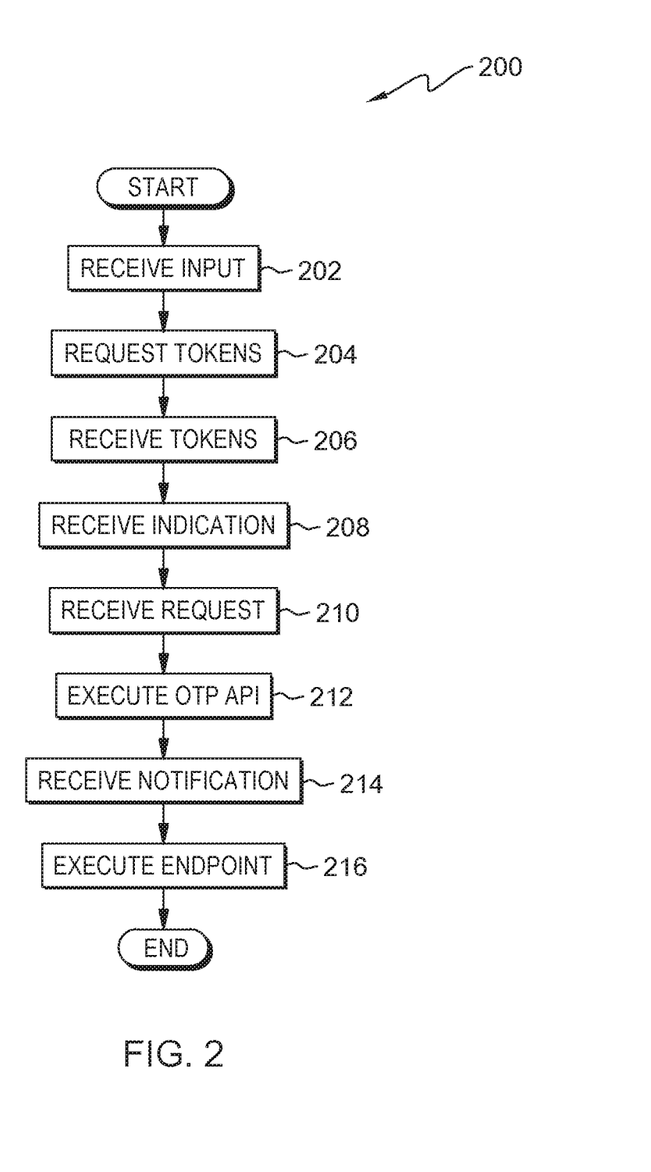
FIG. 2 is a flowchart depicting operational steps of a program that functions to access, initiated by a service provider, a high value transaction using an additional authentication, in accordance with an embodiment of the present invention.

FIG. 2 is a flowchart of workflow 200 representing operational steps for accessing, initiated by a service provider, a high value transaction using an additional authentication. In one embodiment, authentication program 146 performs the operational steps. In an alternative embodiment, any other program, while working with authentication program 146, may perform the operational steps. In an embodiment, authentication program 146 may invoke workflow 200 upon the request of a user. In an alternative embodiment, authentication program 146 may invoke workflow 200 automatically when an FSSO is detected. In an embodiment, any of the operational steps may be performed in any order.

In an embodiment, authentication program 146 receives input (step 202). In other words, authentication program 146 has received an input that a user has initiated an access to a website hosted by a service provider and that an authorization is required. In one embodiment, a user of client device 140 has initiated access, over network 110, to a website hosted by service provider 120 which requires validated credentials. For example, Joe has used the web browser on his tablet to open the website of his credit union which is hosted by a service provider. The service provider redirects the browser on the tablet to an identity provider where Joe enters his FSSO credentials (i.e., his user id and password).

In an embodiment, authentication program 146 requests tokens (step 204). In other words, authentication program 146 requests access to the tokens created by the authorization provider at the identity provider. The tokens may be used to access high value resources at a service provider and it is scoped or restricted to only provide that access. The token is analogous to a valet key included with a luxury car. The valet key may only start the car and allow it to be driven a mile or two. The valet key may not allow access to the trunk or the onboard cell phone address book. In a similar manner, the token provides access only to the high value resource and no other areas at the service provider. Stated another way, the token is scoped only to the API authorization. In an embodiment, identity programs 132, included in identity provider 130, generates the limited access tokens. For example, after Joe enters the FSSO credentials, tokens are created when the FSSO credentials are validated. The authentication result and the tokens are transferred to the service provider hosting the credit union website.

In an embodiment, authentication program 146 receives tokens (step 206). In other words, authentication program 146 receives the tokens created by the authorization provider. In one embodiment of the present invention, the tokens created by identity programs 132 are provided to service provider 120, identity provider 130, and authentication program 146. For example, the tokens created based on Joe logging into the credit union website are stored at the service provider and made available to authentication program 146 for future use.

In an embodiment, authentication program 146 receives an indication (step 208). In other words, authentication program 146 receives an indication that the tokens have been inserted into the security protocol attributes and are validated and maintained by the identity provider. In an embodiment of the present invention, authentication program 146 receives an indication that the tokens have been inserted into security protocol 122. For example, the tokens created based on Joe logging into the credit union website are inserted into security protocol 122.

In an embodiment, authentication program 146 receives a request (step 210). In other words, authentication program 146 receives a request that a user has requested access to a high value transaction. In an embodiment of the present invention, a user of client device 140 requests access to a high value transaction to a website the user is visiting hosted by service provider 120. For example, Joe has requested the payment service feature of the credit union website in order to pay a medical bill.

In an embodiment, authentication program 146 executes the OTP API (step 212). In other words, after the service provider displays the one-time password input form to the user, authentication program 146 retrieves the scoped tokens and invokes the OTP API using the scoped tokens. In an embodiment of the present invention, authentication program 146 retrieves the scoped tokens from the OTP API service provider and requests the one time password from identity programs 132. In one embodiment, the OTP API service provider may be the identity provider which authorized the original FSSO credentials. In an embodiment, the identity provider supplies the OTP to the service provider which then uses the OTP API to validate the response. In an embodiment, the OTP may be transmitted to the user via an e-mail. In another embodiment, the OTP may be delivered to the user via an SMS (short message service) text message. In yet another embodiment, the OTP may be transmitted to the user via a phone call. For example, Joe receives an e-mail which includes a one time password which Joe must submit to the credit union website to access the high value transaction. Joe is not required to re-enter his user id and password.

In an embodiment, authentication program 146 receives a notification (step 214). In other words, authentication program 146 receives notice that the user has submitted the one time password to the service provider. In one embodiment, the user of client device 140 submits the OTP to service provider 120 over network 110. For example, Joe submits the OTP, received via an e-mail, to the service provider hosting the website of the credit union.

In an embodiment, authentication program 146 executes the endpoint (step 216). In other words, authentication program 146 receives validation of the scoped tokens from the identity provider. Authentication program 146 then presents the OTP to the identity provider for verification. Validating the OTP allows the user access to the high value transaction at the service provider. In an embodiment of the present invention, the user of client device 140 is granted access to the high value transaction hosted by service provider 120. For example, Joe is given access to the payment service feature at the website of the credit union allowing Joe to pay a medical bill.

Figure 3:
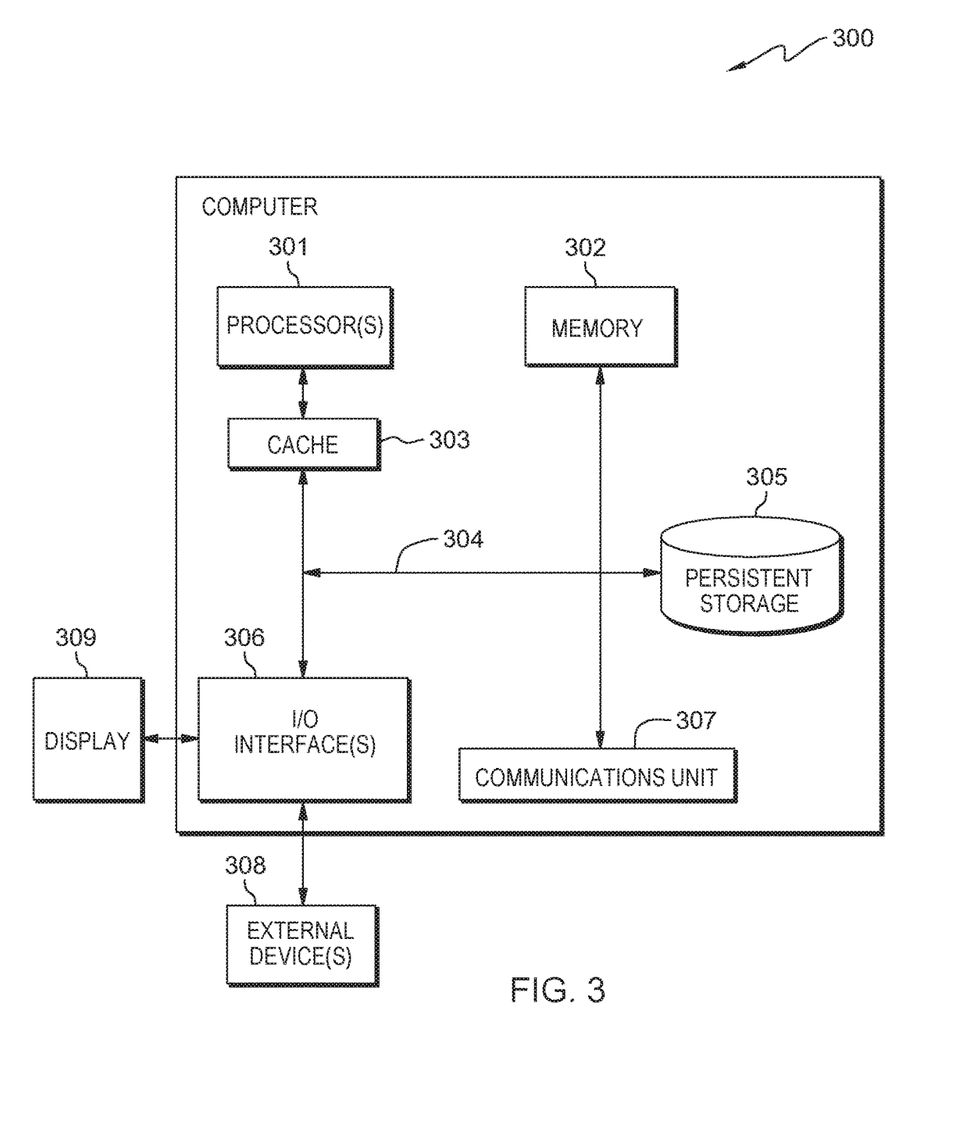
FIG. 3 depicts a block diagram of the components of the computing system of FIG. 1, in accordance with an embodiment of the present invention.

FIG. 3 depicts computer system 300 which is an example of a system that includes authentication program 146. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for accessing, initiated by a service provider, a high value transaction website using an additional authentication, the method comprising:

accessing, by a processor, a website hosted by a service provider, wherein;
the access to the website requires an authorization of a user identification associated with the user and a password associated with the user; and
the website utilizes Federated Single Sign-On (FSSO) along with a plurality of websites;
responsive to receiving a validated user identification associated with the user and password associated with the user, requesting, by the processor, a token from an identity provider that maintains the FSSO credentials for the website, wherein;
the token provides access to an application programming interface (API) for the plurality of websites utilizing FSSO;
the token restricts the user to access only a transaction at the website; and
the transaction requires an additional credential, beyond the user identification associated with the user and the password associated with the user, to acquire access;
receiving, by the processor, the token and causing the token to be stored at the service provider;
receiving a second indication, by the processor, that the token has been inserted into a security protocol and is validated by the identity provider, wherein the security protocol is an open standard data format for exchanging authentication and authorization data between a plurality of processors;
receiving, by the processor, a second indication that the user's session of the website has expired;
subsequent to the second indication that the user's session of the website has expired, requesting to access, by the processor, the transaction at the website;
executing, by the processor, the API, using the token, to determine the service provider has access to the token associated with the user and to request a one-time password, from the identity provider, for access to the transaction at the website;
subsequent to the second indication that the user's session of the website has expired, causing, by the processor, the one-time password to be transmitted to the user without the user resubmitting the user identification associated with the user and the password associated with the user; and
responsive to validation of a submission of the one-time password accessing, by the processor, the transaction at the website hosted by the service provider.

2. The method of claim 1, further comprising:

receiving, by the processor, a third indication that the user has provided the one-time password to access the transaction;
receiving, by the processor, a fourth indication from the identity provider that the one-time password has been verified, and
responsive to receiving the fourth indication that the one-time password has been verified, executing, by the first processor, an endpoint, wherein the endpoint allows access to the transaction at the website hosted by the service provider.

3. The method of claim 1, wherein the service provider provides web hosting services to the user.

4. A computer program product for accessing, initiated by a service provider, a high value transaction using an additional authentication, the computer program product comprising:
one or more computer readable storage devices; and
program instructions stored on the one or more computer readable storage devices, the program instructions comprising:
program instructions to access a website hosted by a service provider, wherein;
the access to the website requires an authorization of a user identification associated with the user and a password associated with the user; and
the website utilizes Federated Single Sign-On (FSSO) along with a plurality of websites;
responsive to receiving a validated user identification associated with the user and password associated with the user, program instructions to request a token from an identity provider that maintains the FSSO credentials for the website, wherein;
the token provides access to an application programming interface (API) for the plurality of websites utilizing Federated Single Sign-On (FSSO);
the token restricts the user to access only a transaction at the website; and
the transaction requires an additional credential, beyond the user identification associated with the user and the password associated with the user, to acquire access;
program instructions to receive the token and cause the token to be stored at the service provider;
program instructions to receive a second indication that the token has been inserted into a security protocol and is validated by the identify provider, wherein the security protocol is an open standard data format for exchanging authentication and authorization data between a plurality of processors;
program instructions to receive a second indication that the user's session of the website has expired;
subsequent to the second indication that the user's session of the website has expired, program instructions to request to access the transaction at the website;
program instructions to execute the API, using the token, to determine the service provider has access to the token associated with the user and to request a one-time password, from the identity provider, for access to the transaction at the website;
subsequent to the second indication that the user's session of the website has expired, program instructions to cause the one-time password to be transmitted to the user without the user resubmitting the user identification associated with the user and the password associated with the user; and
responsive to validation of a submission of the one-time password, program instructions to access the transaction at the website hosted by the service provider.

5. The computer program product of claim 4, further comprising program instructions, stored on the one or more computer readable storage devices, to:
receive a third indication that the user has provided the one-time password to access the transaction;
receive a fourth indication from the identity provider that the one-time password has been verified, and
responsive to receiving the fourth indication that the one-time password has been verified, execute an endpoint, wherein the endpoint allows access to the transaction at the website hosted by the service provider.

6. The computer program product of claim 4, wherein the service provider provides web hosting services to the user.

7. A computer system for accessing, initiated by a service provider, a high value transaction using an additional authentication, the computer system comprising:
one or more computer processors;
one or more computer readable storage devices, wherein the one or more computer readable storage devices are not transitory signals per se; and
program instructions stored on the one or more computer readable storage devices for execution by at least one of the one or more computer processors, the program instructions comprising:
program instructions to access a website hosted by a service provider, wherein;
the access to the website requires an authorization of a user identification associated with the user and a password associated with the user; and
the website utilizes Federated Single Sign-On (FSSO) along with a plurality of websites;
responsive to receiving a validated user identification associated with the user and password associated with the user, program instructions to request a token from an identity provider that maintains the FSSO credentials for the website, wherein;
the token provides access to an application programming interface (API) for the plurality of websites utilizing FSSO;
the token restricts the user to access only a transaction at the website; and
the transaction requires an additional credential, beyond the user identification associated with the user and the password associated with the user, to acquire access;
program instructions to receive the token and cause the token to be stored at the service provider;
program instructions to receive a second indication that the token has been inserted into a security protocol and is validated by the identify provider, wherein the security protocol is an open standard data format for exchanging authentication and authorization data between a plurality of processors;
program instructions to receive a second indication that the user's session of the website has expired;
subsequent to the second indication that the user's session of the website has expired, program instructions to request to access the transaction at the website;
program instructions to execute the API, using the token, to determine the service provider has access to the token associated with the user and to request a one-time password, from the identity provider, for access to the transaction at the website;
subsequent to the second indication that the user's session of the website has expired, program instructions to cause the one-time password to be transmitted to the user without the user resubmitting the user identification associated with the user and the password associated with the user; and
responsive to validation of a submission of the one-time password, program instructions to access the transaction at the website hosted by the service provider.

8. The computer system of claim 7, further comprising program instructions, stored on the one or more computer readable storage devices for execution by at least one of the one or more computer processors, to:
  receive a third indication that the user has provided the one-time password to access the transaction;
  receive a fourth indication from the identity provider that the one-time password has been verified, and
  responsive to receiving the fourth indication that the one-time password has been verified, execute an endpoint, wherein the endpoint allows access to the transaction at the website hosted by the service provider.

* * * * *